United States Patent [19]

O'Gorman

[11] Patent Number: 5,828,792
[45] Date of Patent: Oct. 27, 1998

[54] METHOD OF REDUCING DOCUMENT SIZE FOR DIGITAL DISPLAY

[75] Inventor: Lawrence Patrick O'Gorman, Madison, N.J.

[73] Assignee: Lucent Technologies, Inc., Murray Hill, N.J.

[21] Appl. No.: 762,822

[22] Filed: Dec. 6, 1996

Related U.S. Application Data

[63] Continuation of Ser. No. 371,939, Jan. 12, 1995, abandoned, which is a continuation of Ser. No. 137,567, Oct. 15, 1993, abandoned.

[51] Int. Cl.$^6$ ................................................. G06K 9/00
[52] U.S. Cl. ........................ 382/263; 382/299; 358/447
[58] Field of Search .................................. 382/254, 260, 382/263, 268, 269, 261, 264, 274, 299; 358/447

[56] References Cited

U.S. PATENT DOCUMENTS

| | | | |
|---|---|---|---|
| 4,156,231 | 5/1979 | Edamatsu et al. | 382/206 |
| 4,571,635 | 2/1986 | Mahmoodi et al. | 382/54 |
| 4,783,840 | 11/1988 | Song | 382/263 |
| 4,941,190 | 7/1990 | Joyce | 382/54 |
| 5,016,104 | 5/1991 | Lim | 358/463 |
| 5,038,388 | 8/1991 | Song | 382/54 |
| 5,212,741 | 5/1993 | Barski et al. | 382/54 |
| 5,218,649 | 6/1993 | Kundu et al. | 382/54 |
| 5,331,414 | 7/1994 | Golin | 348/390 |
| 5,526,446 | 6/1996 | Adelson et al. | 382/260 |
| 5,602,942 | 2/1997 | Takemoto et al. | 382/263 |
| 5,649,031 | 7/1997 | Nakamura et al. | 382/263 |

OTHER PUBLICATIONS

Patent No. Application No. 89312750.6, published in EPO on Jun. 13, 1990, Publication No. 0372950, to Yasuji Hirabayashi, Mitsuru Maeda, Tadashi Yoshida, Akihiro Katayama. Class: H04N 1 393. Translation: yes.

L. O'Gorman, et al., "A Comparison of Methods and Computation for Multi–Resolution Low and Band–Pass Transforms for Image Processing", *Computer Vision, Graphics, and Image Processing*, vol. 37, pp. 386–401 (1987).

*Primary Examiner*—Christopher Kelley

[57] ABSTRACT

A method of enhancing predefined features of a scanned image of a document page of reduced size for display includes subsampling the pixels of the scanned image to achieve a desired degree of reduction of the image size. The subsampled signals are passed through a filter to obtain gray scale values. A sharpening filter is applied to the subsampled pixels to enhance the predefined features of the image.

13 Claims, 3 Drawing Sheets

METHOD OF REDUCING DOCUMENT SIZE FOR DIGITAL DISPLAY

This is a continuation of application Ser. No. 08/371,939 filed Jan. 12, 1995, now abandoned, which in turn is a continuation of application Ser. No. 08/137,567, filed on Oct. 15, 1993 now abandoned.

BACKGROUND OF THE INVENTION

The present invention is directed to a method of reducing the image size of a document page for digital display and, more particularly, to a method of enhancing the features of the reduced image.

Electronic document systems are becoming increasingly popular for storing reference materials. Conventional electronic document systems comprise a scanner which scans an original document, digitizes each page of the document image and converts the image to picture elements, or pixels; a computer for processing the digitized signals and for performing any modifications to the image such as, but not limited to, size reduction; and a monitor for viewing the scanned document. The scanned documents are then stored for later retrieval.

Electronic documents can be easily retrieved from a document system's memory and viewed on a monitor. However, the amount of data contained in a standard 8.5×11 inch document page significantly exceeds the amount of data which can be viewed on a typical monitor. In particular, a standard image resolution for document scanners is 300 pixels per inch (conventionally referred to as dots per inch or dpi). Thus, for an 8.5×11 inch document page, the scanned size is 2550×3300 pixels. The pixel dimensions of the screen of a conventional monitor are 1600×1280. Based on these measurements, it is evident that a full page cannot be completely displayed on such a monitor.

It is, thus, well known that if the entire document page is to be viewed on the monitor, the amount of data contained in the document page must be reduced. Indeed, one approach known in the prior art is to subsample the image in such a way as to match the pixels of the subsampled image with those of the monitor on which it is to be displayed. This approach, however, can result in a severe loss of clarity, such as edge definition, and a noticeable reduction in the size of, for example, text or other features. In the above illustration, for example, no less than 38% of the image data is lost.

In standard digital signal image processing practice, a low-pass filter is applied to the document image signals during subsampling. The low pass filtering is required to reduce aliasing of higher frequency information upon the lower frequency information left after subsampling effectively at a lower rate. The low pass filter is typically a K×K filter which is sized in accordance with the amount of reduction desired. Typically, the size of the filter, i.e., the value of K is directly related to the sampling rate, i.e., the larger the sampling rate, the larger the filter, in accordance with standard filter theory as described in L. O'Gorman, et al., "A Comparison of Methods and Computation for Multi-Resolution Low and Band-Pass Transforms for Image Processing", *Computer Vision, Graphics, and Image Processing,* Vol. 37, pp. 386–401 (1987). However, the low pass filtering causes degradation of the text by, for example, rounding corners, shortening endlines and filling holes and small gaps. Such degradation reduces readability of the text.

SUMMARY OF THE INVENTION

In accordance with the present invention, the problem of degradation of the text is overcome by enhancing a reduced pixel image of a document page by increasing the gray scale value of pixels determined to represent predefined features thereby sharpening the gray scale image.

In an illustrative embodiment, a sharpening filter is applied to each pixel in a gray scale image which compares a pixel X0 with at least one neighboring pixel. If the gray scale value of pixel X0 is greater than the gray scale value of the at least one neighboring pixel, the gray scale value of pixel X0 is increased. This technique causes predefined features of the text to be enhanced thereby preserving the clarity of the original document.

DETAILED DESCRIPTION

Figure 1:
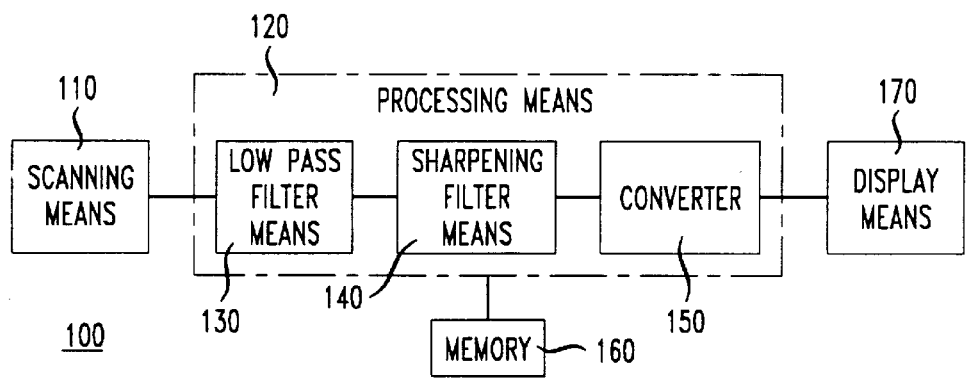
FIG. 1 is a block diagram of an electronic document system in accordance with the present invention.

Referring to FIG. 1, there is shown an electronic document system 100 for implementing a method of reducing the size of a document image in accordance with the present invention. An original document (not shown) is scanned by a scanner 110 which converts the document to digital image signals. In the preferred embodiment, the document is comprised primarily of information-bearing data, illustratively, data representing text containing alphanumeric characters and figures, such as, graphs, tables and drawings. The digital image signals are transmitted to a processor 120 which processes the signals for a display 170. The processor 120 can be any type of computer system such as a personal computer or computer workstation.

The processor 120 includes a low pass filter 130 which samples the image signals at a predetermined subsampling rate. The subsampling rate is calculated in any known manner to produce a desired reduction in the amount of data contained in the document page. The subsampled signals are convolved with the low pass filter 130 to obtain a gray scale image. In accordance with the present invention, the gray scale image signals are then passed through a sharpening filter 140 which sharpens certain predefined features of the text which were degraded by the low pass filter 130 as described in detail below. The sharpened signals are transmitted to a converter 150 which converts the image signals to binary signals. The binary signals are stored in a memory 160 for future display. Alternatively, the gray scale image can be stored in memory 160 for future display.

Figure 2A:
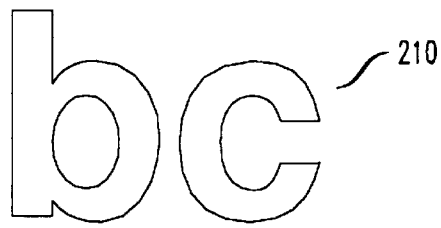
FIGS. 2a–2c illustrate a text image to which a low pass filter has been applied.
Figure 2B:
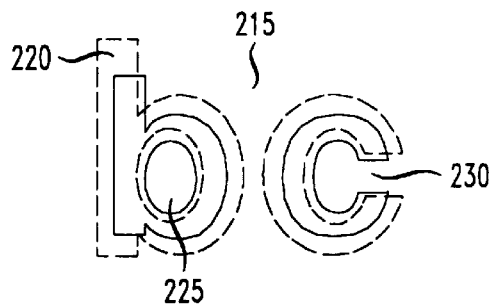
Figure 2C:
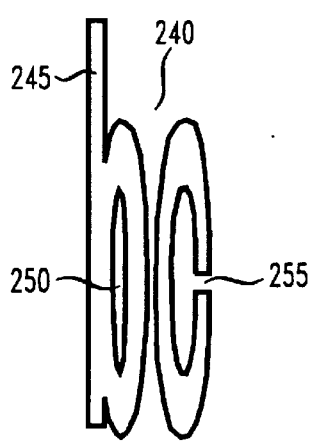

FIG. 2a illustrates an example of characters 210 which have been processed without a sharpening filter. Referring to FIG. 2b, after the original image signals have been convolved with the low pass filter and subsampled at the desired subsampling rate, the characters 215 of the subsampled image have rounded edges as illustrated by the endline 220 of the "b", and the hole 225 of the "b" is smaller. The ends 230 of the "c" character are moved closer together as well. Referring to FIG. 2c, the convolved image signals are converted to binary signals thereby producing binary characters 240. As can be seen, the processed "b" character has an enhanced rounded endline 245 and the hole 250 at the bottom of the "b" is almost nonexistent. The ends 255 of the processed "c" character are significantly closer together thereby making the "c" look very much like an "o".

Figure 3:
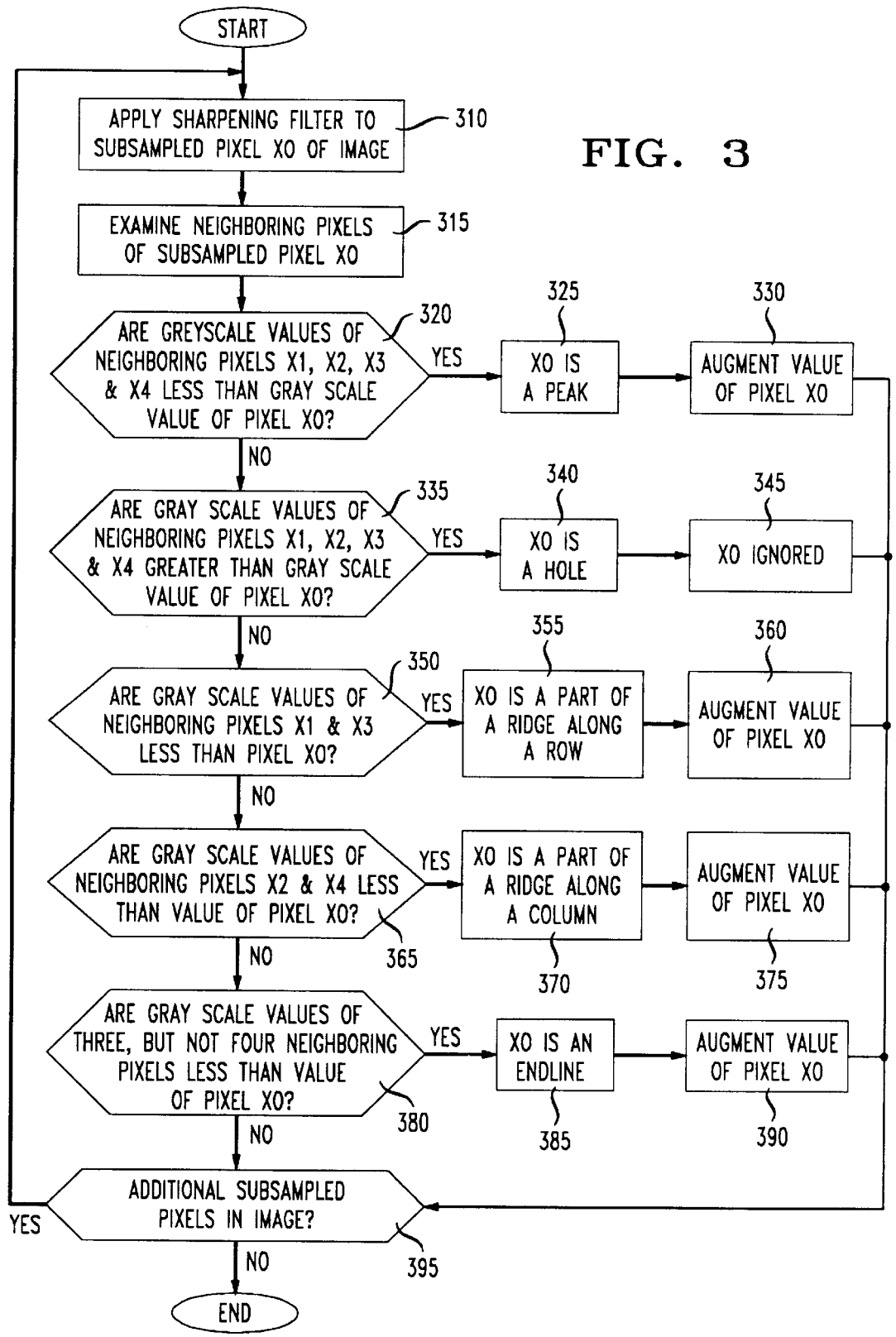
FIG. 3 is a flow chart depicting a method of sharpening gray scale image signals prior to binarization in accordance with the embodiment of the present invention.

By applying a sharpening filter to the gray scale image signals, the image signals become more readable. FIG. 3 illustrate a flow chart depicting a method of sharpening the image signals prior to converting the gray scale signals to binary signals. A sharpening filter is applied to each subsampled pixel X0 by raster scanning each row and column of the image to determine the features represented by the particular subsampled pixel (step 310). The sharpening filter is a 3×3 cross filter as illustrated below:

$$\begin{array}{ccc} & X1 & \\ X4 & X0 & X2 \\ & X3 & \end{array}$$

Typically, there are at least four basic predefined features which are degraded by the low pass filter and require sharpening. A first feature is a peak, such as a period "." or a dot as in the letter "i". A second feature is a hole such as occurs in the letters "o" and "d". A third feature is a part of a ridge which includes the vertical and horizontal strokes of a letter such as in the letters "H" and "L". A fourth feature is an endline which is a stroke which extends from the end of a letter such as in the letters "b" and "p".

Figure 4A:
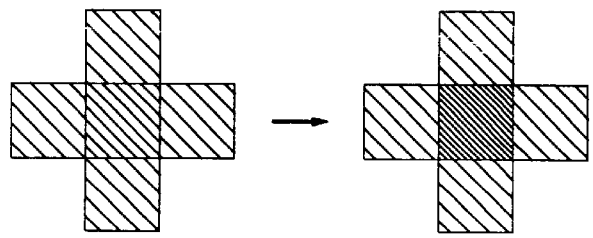
FIGS. 4a–4e illustrate the application of a sharpening filter to various portions of a text image.
Figure 4B:
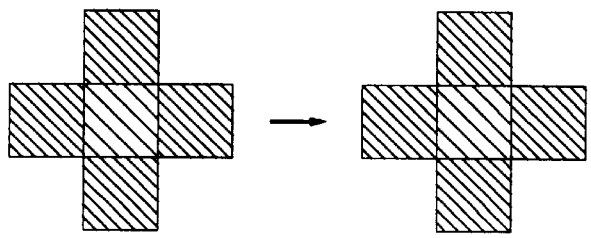

In evaluating whether any of the pixels in an image contain one of these four predefined features, the four neighboring pixels, i.e., X1, X2, X3, X4, of each subsampled pixel X0 are examined (step 315). If the subsampled pixel represents part of one of the four features, the pixel may be augmented to sharpen its feature. The pixel X0 is preferably augmented to a higher gray scale value which causes the pixel to be turned ON (1) when converted to a binary signal. If the subsampled pixel is not part of one of the identified features, the pixel is ignored. Referring to FIG. 4a, if the gray scale value of all of the neighboring pixels of X0 are less than the gray scale value of X0 (step 320), it is determined that X0 is a peak (step 325). The sharpening filter augments the value of pixel X0 such that its gray scale value is approximately four times the intensity of each of pixels X1, X2, X3, X4 (step 330). Referring to FIG. 4b, if the value of all the neighboring pixels of X0 are greater than the subsampled pixel X0 (step 335), it is determined that X0 is a hole (step 340). As such, pixel X0 is ignored and is subjected to noise filtering which causes pixel X0 to be OFF (step 345).

Figure 4C:
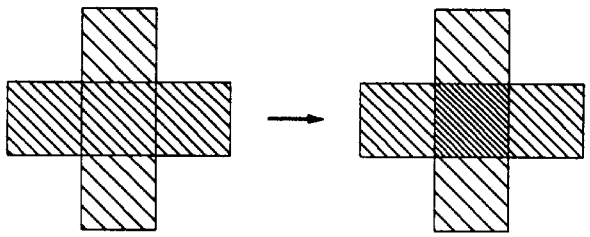
Figure 4D:
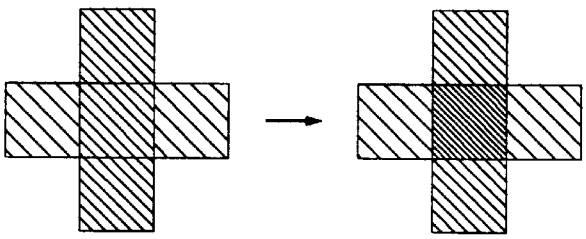
Figure 4E:
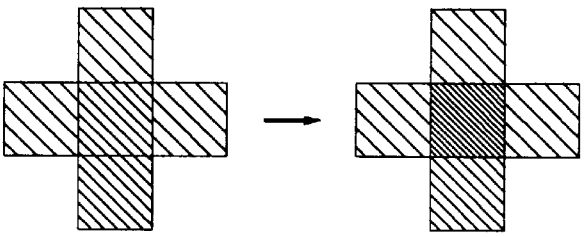

Referring to FIG. 4c, if the gray scale value of neighboring pixels X1 and X3 are less than the value of subsampled pixel X0 and the value of pixels X2 and X4 are greater than or equal to the value of pixel X0 (step 350), then it is determined that pixel X0 is part of a ridge along a row (step 355). The sharpening filter augments the value of pixel X0 such that it is approximately twice the value of pixels X2 and X4 (step 360). Referring to FIG. 4d, if the gray scale value of neighboring pixels X2 and X4 are less than the value of subsampled pixel X0 and the value of pixels X1 and X3 are greater or equal to the value of pixel X0 (step 365), then it is determined that pixel X0 is part of a ridge along a column (step 370). The sharpening filter augments the value of pixel X0 such that it is approximately twice the value of pixels X1 and X3 (step 375). Referring to FIG. 4e, if the gray scale value of subsampled pixel X0 is greater than any three of the neighboring pixels, but not all four neighboring pixels (step 380), it is determined that subsampled pixel X0 is on an endline (step 385). The sharpening filter augments the value of pixel X0 such that it is approximately twice the value of three lower value neighboring pixels (step 390).

After the pixel has been examined and its features sharpened, the next pixel is examined until all of the pixels in the image have been examined (step 395). If the image is to be converted to binary signals, each subsampled pixel is compared to a predetermined threshold value. If the gray scale value of the pixel is greater than the threshold, the pixel is set to ON (1). If the pixel is less than the threshold value, the pixel is set to OFF (0). The binary signals are stored in memory and can be retrieved for display on a monitor. The reduction in image size allows for more of the image or all of the image to be viewed on the monitor.

The foregoing merely illustrates the principles of the invention and it will thus be appreciated that those skilled in the art will be able to devise numerous alternative arrangements which, although not explicitly described herein, embody the principles of the invention and are within its scope and spirit.

I claim:

1. A method for generating from an electronic document page having a first resolution a representation of the document page for display on a display device capable of displaying an image having a second resolution which is lower than the first resolution of the electronic document page, the method including enhancing at least one feature of the reduced image, each feature corresponding to one of at least one predefined feature, each predefined feature corresponding to a particular attribute of a text character, each predefined feature represented by a predetermined topological arrangement of pixels, each pixel having a particular gray scale value, the method comprising:

passing the pixels through a low pass filter;

subsampling pixels of the image to achieve a desired degree of reduction of the image size;

applying a sharpening filter to the subsampled pixels which compares a set of pixels within the reduced image, said set comprising one or more pixels within the reduced image, and a plurality of neighboring pixels;

determining if a match exists between the set of pixels and one of a plurality of fixed stored pixel arrangements, each fixed stored pixel arrangement corresponding to a particular one of the at least one predefined feature; and modifying the gray scale value of the one or more pixels in those pixel sets which match one of the fixed stored pixel arrangements such that the corresponding predefined feature represented by said first set is enhanced, said modifying step modifying the gray scale value of the one or more pixels based on any of the group of a peak, a hole, a ridge, or an endline and further comprising:

increasing the gray scale value of the one or more pixels if the gray scale value of the one or more pixels is greater than the gray scale value of at least one of the neighboring pixels, and maintaining the gray scale value of the one or more pixels if the gray scale value of the one or more pixels is less than the gray scale value of the plurality of neighboring pixels.

2. The method according to claim 1 further comprising the step of: converting the gray scale image to a binary image.

3. The method according to claim 1 wherein said predefined feature is a peak.

4. The method according to claim 1 wherein said predefined feature is a ridge.

5. The method according to claim 1 wherein said predefined feature is a hole.

6. The method according to claim 1 wherein said predefined feature is an endline.

7. The method according to claim 1 wherein said sharpening filter is a 3×3 cross filter.

8. A method for generating from an electronic document page having a first resolution a reduced scanned image of the document page on a display device capable of displaying the reduced scanned image having a second resolution which is corresponds to the reduced scanned image, the method including enhancing at least one topological feature of the reduced scanned image, each topological feature corresponding to one of at least one predefined topological feature, each predefined topological feature corresponding to a particular attribute of a text character, said scanned image comprising a plurality of pixels, each pixel having a predetermined gray scale value, each topological feature represented by a predetermined topological arrangement of pixels based on the gray scale value, the method comprising:

a) comparing the gray scale value of a set of pixels, said set comprising a pixel X0 in the reduced image and at least four neighboring pixels;

b) determining if a match exists between the set of pixels and one of a plurality of fixed stored pixel arrangements, each fixed stored pixel arrangement corresponding to a particular one of the at least one predefined topological feature;

c) modifying the gray scale value of the pixel X0 if one of the topological features is identified, said modifying step modifying the gray scale value of the pixel X0 based on any of the group of a peak, a hole, a ridge, or an endline and further comprising:

increasing the gray scale value of the pixel X0 if the gray scale value of the pixel X0 is greater than the gray scale value of at least one of the four neighboring pixels, and maintaining the gray scale value of the pixel X0 if the gray scale value of the pixel X0 is less than the gray scale value of each one of the four neighboring pixels; and d) repeating steps a)–c) for at least one pixel in the image.

9. The method according to claim 8 further comprising the step of: d) converting the gray scale image to a binary image.

10. The method according to claim 8 wherein said predefined feature is a peak.

11. The method according to claim 8 wherein said predefined feature is a ridge.

12. The method according to claim 8 wherein said predefined feature is a hole.

13. The method according to claim 8 wherein said predefined feature is an endline.

* * * * *